(12) United States Patent
Sin et al.

(10) Patent No.: US 7,027,274 B1
(45) Date of Patent: Apr. 11, 2006

(54) SPIN-DEPENDENT TUNNELING READ/WRITE SENSOR FOR HARD DISK DRIVES

(75) Inventors: Kyusik Sin, Pleasanton, CA (US); Yingjian Chen, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 406 days.

(21) Appl. No.: 09/943,859

(22) Filed: Aug. 30, 2001

(51) Int. Cl.
*G11B 5/33* (2006.01)
(52) U.S. Cl. .................................. 360/324.2
(58) Field of Classification Search ........... 360/324.2, 360/327.31, 314, 317; 430/313; 428/692; 29/603.08
See application file for complete search history.

(56) References Cited

U.S. PATENT DOCUMENTS

| | | | | |
|---|---|---|---|---|
| 5,495,378 A | 2/1996 | Bonyhard et al. | ......... | 360/113 |
| 5,608,593 A | 3/1997 | Kim et al. | ......... | 360/113 |
| 5,708,358 A | 1/1998 | Ravipati | ......... | 324/252 |
| 5,790,351 A | 8/1998 | Suzuki | ......... | 360/113 |
| 5,959,810 A | 9/1999 | Kakihara et al. | ......... | 360/113 |
| 6,146,776 A * | 11/2000 | Fukuzawa et al. | ......... | 428/692 |
| 6,381,107 B1 * | 4/2002 | Redon et al. | ......... | 360/324.2 |
| 6,469,879 B1 * | 10/2002 | Redon et al. | ......... | 360/324.2 |
| 6,495,311 B1 * | 12/2002 | Khan et al. | ......... | 430/313 |
| 6,606,781 B1 * | 8/2003 | Gill | ......... | 29/603.08 |
| 6,674,615 B1 * | 1/2004 | Hayashi | ......... | 360/317 |
| 6,680,827 B1 * | 1/2004 | Li et al. | ......... | 360/314 |
| 6,680,832 B1 * | 1/2004 | Fontana et al. | ......... | 360/324.2 |
| 2001/0005301 A1 * | 6/2001 | Komuro et al. | ......... | 360/324.2 |
| 2001/0055184 A1 * | 12/2001 | Shimazawa et al. | ......... | 360/324.2 |

\* cited by examiner

*Primary Examiner*—Tianjie Chen
(74) *Attorney, Agent, or Firm*—Jonathan E. Prejean, Esq.

(57) ABSTRACT

A hard biased spin-dependent tunneling sensor and manufacturing method therefor is provided having a substrate with a first lead formed thereon. A hard magnet is formed over the first lead and a free layer is formed over the hard magnet. A tunneling barrier layer with a first pinned layer formed thereon is formed over the free layer. A nonmagnetic coupling layer with a second pinned layer formed thereon is formed over the first pinned layer. A pinning layer is formed over the second pinned layer and a second lead is formed over the pinning layer.

18 Claims, 5 Drawing Sheets

SPIN-DEPENDENT TUNNELING READ/WRITE SENSOR FOR HARD DISK DRIVES

TECHNICAL FIELD

The present invention relates generally to hard disk drives and more particularly to spin-dependent tunneling read heads with longitudinal hard bias.

BACKGROUND ART

A large portion of the data storage in today's computers uses magnetic media such as magnetic disks. Data is presented to a computer by huge numbers of bits (ones and zeroes) and stored on disks where each bit is represented by a transition, which causes an applied magnetic field. In order to read or write the value of any given bit, a read/write sensor is used, which includes one portion for changing or writing to the disk and another portion for detecting or reading changes in the applied magnetic field.

In the read portion, a sensor that changes electrical resistance in response to a magnetic field, called a magnetoresistive (MR) sensor, is employed. In the past, sensors utilized the anisotropic magnetoresistive (AMR) effect where a read element resistance varies in proportion to the square of the cosine of the angle between the magnetization in the read element and the direction of a sense current flowing through the read element. The sensor reads data from magnetic transitions recorded in the media. The magnetic field, resulting from a transition, causes a change in the direction of the magnetization in the read element. The new magnetization direction changes the resistance of the read element with a corresponding change in the sense current or voltage.

More sensitive sensors used a larger form of magnetoresistance called the giant magnetoresistance (GMR) effect. The GMR effect occurs in multilayer thin films of alternating ferromagnetic and nonferromagnetic metals. The resistance of a GMR film changes according to the cosine of the angle between the magnetization of the ferromagnetic (FM) layers.

The most commonly used sensors now are a subset of the GMR devices called a "spin valve" in which two ferromagnetic layers, a "free" layer and a "pinned" layer, are used. When the magnetization in the two layers are aligned, the resistance is at a minimum. When the magnetization is anti-aligned, the resistance is at a maximum. The resistance varies as the cosine of the angle between the magnetizations and is independent of the direction of current flow. The magnetization of the pinned layer is held in place by depositing it next to a layer of antiferromagnetic (AFM) material with a resulting exchange coupling of the two layers. The free layer magnetization is free to rotate in response to the field from the disk. In this way, the magnetization swings between being parallel (low resistance state) to anti-parallel (high resistance state) as the head flies over recorded magnetic transitions on the disk. The resulting change in electrical resistance arising from the GMR effect is sensed and the magnetic information on the disk is transformed into electrical signals.

Newer even more sensitive sensors are required which are more sensitive to smaller recorded transitions on higher density media. However, previous sensors have reached their limits so new technologies are being investigated. One new technology that has previously unsuccessfully been investigated is called "spin-dependent tunneling (SDT)" sensor. An SDT sensor differs from the older spin valves by having an insulator between the two magnetic layers. The current passes through perpendicular to the trilayers as compared to parallel in the case of a spin valve sensor. This perpendicular flow makes it difficult to provide a hard bias to stabilize the domains in the sensor; however, it is believed that an SDT sensor would be more sensitive than the current state of the art.

The problem with SDT sensors is that the hard bias requires a hard or permanent magnet, to pin edge of the free layer and the hard magnet interferes with the tunneling current, which is perpendicular to the layers. This hard bias is referred to as "longitudinal hard bias" because it is directionally parallel to the longitudinal direction of the disk media surface.

Problem with obtaining a satisfactory longitudinal hard bias is one of the biggest problems in the industry and is one of the reasons that it has not been possible to produce a dependable recording head using this spin-dependent tunneling technology.

Some attempts have been made to make a spin-dependent tunneling sensor using a hard magnet at the sides of the free layer, which is outside of the tunneling magnetoresistance junction. Unfortunately, previous systems required two free layers in this configuration, which added to complexity and cost.

Another structure involved an insulator between the free layer and the hard biasing magnet, but this resulted in the requirement for a thick insulator because the hard biasing strength becomes smaller in proportion to the thickness so that stabilization is inefficient. Conversely, attempts to make the insulator thinner resulted in short-circuiting of the sensor.

Solutions to problems of this sort have been long sought, but have long eluded those skilled in the art.

DISCLOSURE OF THE INVENTION

The present invention provides a hard bias spin-dependent tunneling sensor and manufacturing method therefor having a substrate with a first lead formed thereon. A hard magnet is formed over the first lead and a free layer is formed over the hard magnet. A tunneling barrier layer with a first pinned layer formed thereon is formed over the free layer. A nonmagnetic coupling layer with a second pinned layer formed thereon is formed over the first pinned layer. A pinning layer is formed over the second pinned layer and a second lead is formed over the pinning layer. The hard bias layer, or hard magnet, is in direct contact with the free layer which provides for maximum stabilization and positioning so a short-circuit path through the hard magnet does not create a problem.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
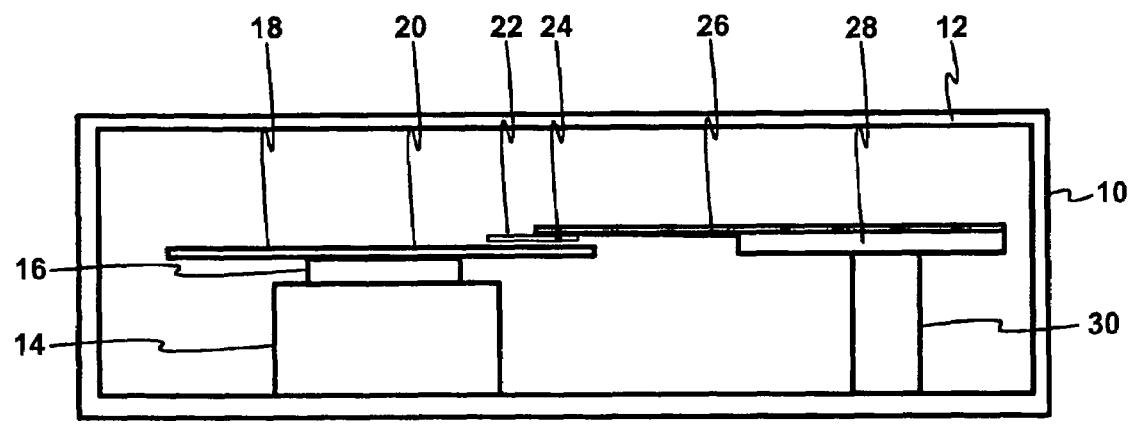
FIG. 1 is a side view schematic of a disk drive system using the present invention.

Referring now to FIG. 1, therein is shown a magnetic recording disk drive system 10. The system 10 has a housing 12 on which a disk drive motor 14 is mounted. The disk drive motor 14 is a high-speed motor having a hub 16 on which one or more magnetic recording disks, such as a magnetic recording disk 20, is mounted.

The term "horizontal" as used herein for the system 10 is defined as a plane parallel to the conventional plane or surface of the recording disk regardless of the orientation of the disk. The term as used herein for the sensor used in the system 10 is defined as a plane parallel to the surface upon which an initial layer is deposited regardless of the subsequent orientation of the surface. The term "longitudinal" as used herein is defined as parallel to the direction of movement of the magnetic recording disk 20. The term "vertical" refers to a direction perpendicular to the horizontal as just defined. Terms, such as "on", "above", "below", "higher", "lower", "over", and "under", are defined with respect to the horizontal plane.

The disk 20 is generally covered by a lubricant to minimize friction during start-up conditions. During operation, a film of air on the disk 20 lifts an air-bearing slider 22 away from the surface due to the rotation of the disk 20. A read/write sensor 24 according to the present invention is mounted to the air-bearing slider 22. The read/write sensor 24 has a spin-dependent tunneling (SDT) sensor incorporated therein having the present invention.

The air-bearing slider 22 and the read/write sensor 24 are held by a suspension arm 26, which provides a spring action to hold the air-bearing slider 22 within a specified range of distances from the surface of the disk 20. The suspension arm 26 is supported by an arm 28, which is rotated by an actuator 30. As the disk drive motor 14 rotates the disk 20, the actuator 30 moves the read/write sensor 24 radially with respect to the surface of the disk 20 to access different data tracks thereon.

Figure 2:
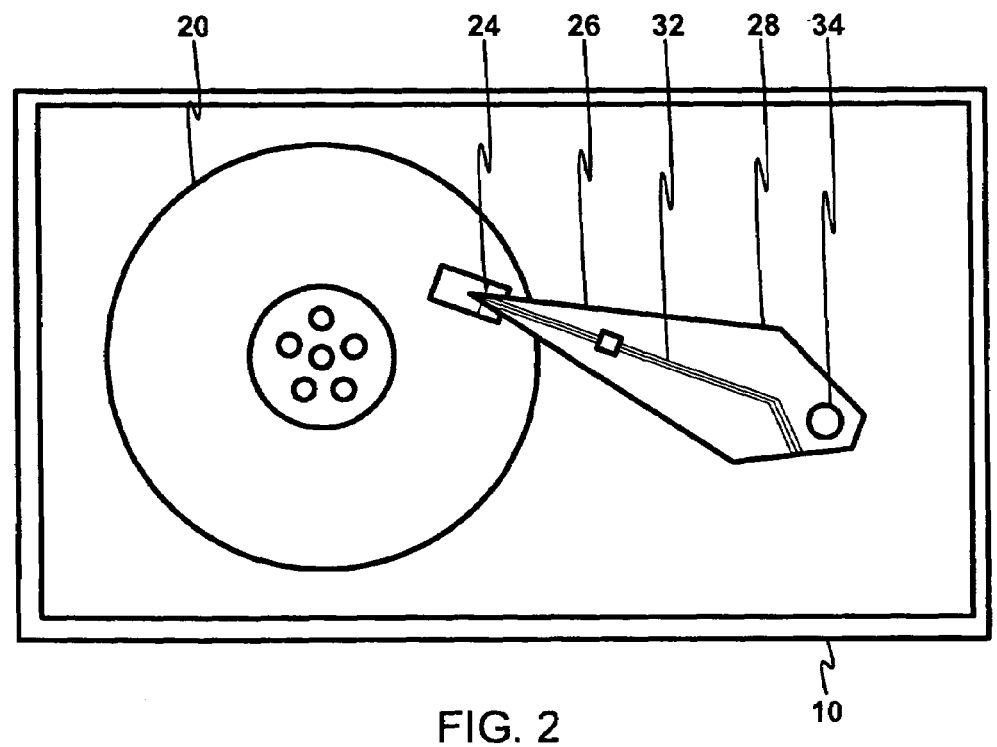
FIG. 2 is a simplified top view of the system incorporating the present invention.

Referring now to FIG. 2, therein is shown the top view of the system 10 with the sensor 24 at the end of the suspension arm 26 and connected by wires 32 to read/write circuitry (not shown). A pivot 34 allows the arm 28 to turn in order to read/write to various tracks on the disk 20.

Figure 3:
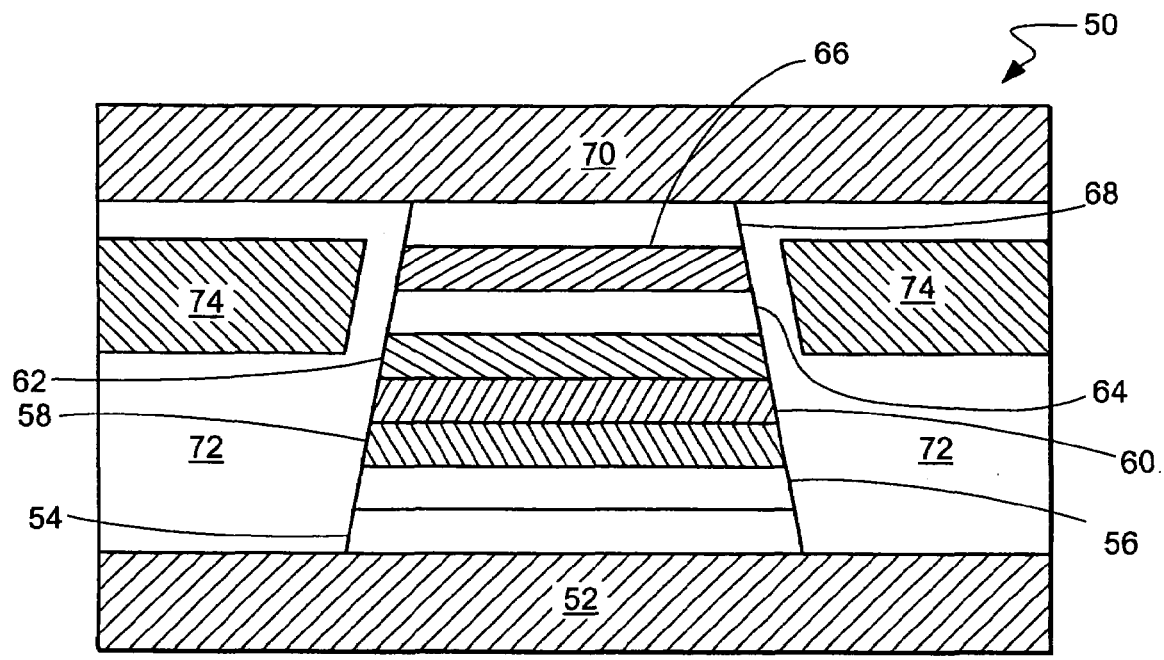
FIG. 3 (PRIOR ART) is a view of a prior art spin-dependent tunneling sensor.

Referring now to FIG. 3 (PRIOR ART), therein is shown a prior art spin-dependent tunneling (SDT) sensor 50. The SDT sensor 50 has a shield/bottom lead 52. A seed layer 54 is deposited on the shield/bottom lead 52. The seed layer 54 is used for growing a good crystal structure antiferromagnet, an antiferromagnet 56, which may be of a material such as iridium manganese (IrMn), platinum manganese (PtMn), platinum palladium manganese (PtPdMn), iron manganese (FeMn), nickel manganese (NiMn).

The antiferromagnet 56 is deposited on the seed layer 54 having a crystal structure, which will provide a good exchange bias for a first ferromagnet 58. The first ferromagnet 58 is a pinned layer.

A nonmagnetic coupling layer 60, such as ruthenium (Ru), is deposited to a thickness of 8–9 Å and a second ferromagnet 62 is deposited on top of the nonmagnetic coupling layer 60. The nonmagnetic coupling layer 60 forms a strong synthetic antiferromagnet between the first and second ferromagnets 58 and 62. The first and second ferromagnets 58 and 62 are generally of cobalt (Co), iron (Fe), cobalt iron (CoFe), nickel iron (NiFe), or cobalt nickel iron (CoNiFe).

A tunneling barrier layer 64 is deposited above the second ferromagnet 62. The tunneling barrier layer 64 is between 5–10 Å thick and generally of aluminum oxide ($Al_2O_3$), aluminum nitride (AlN), or chromium oxide (CrO). It will be understood that the tunneling phenomenon is practical only with very thin tunneling barriers. Tunneling barriers in excess of about 10 Å will generally have too great a resistance for most head applications.

A third ferromagnet 66 is deposited above the tunneling barrier layer 64. The third ferromagnet 66 forms the free layer, which rotates in response to the field from the disk and changes its resistance. The third ferromagnet 66 is generally of cobalt (Co), iron (Fe), cobalt iron (CoFe), nickel iron (NiFe), or cobalt nickel iron (CoNiFe).

A capping layer 68 is deposited on top of the third ferromagnet 66 to provide protection to the third ferromagnet 66 during processing. The capping layer 68 is generally of tantalum (Ta) or nickel iron chromium (NiFeCr).

A shield/top lead 70 is deposited on top of the capping layer 68. The alternating current, which is sensed, passes between the shield/bottom lead 52 and the shield/top lead 70. The interior current flow portions of the SDT sensor 50 are insulated from the outside environment except at the shield/bottom and shield/top leads 52 and 70, respectively, by an insulator 72, which is generally of an insulating oxide.

The insulator 72 further carries a permanent or hard biased magnet 74 and insulates the hard magnet 74 from the third ferromagnet 66 while longitudinally hard biasing it. Without the hard magnet 74, the signal will be extremely noisy and the SDT sensor 50 less sensitive. The hard magnet 74 generally has a chromium (Cr) seed upon which cobalt chrome platinum (CoCrPt) is deposited.

The thickness of the insulator 72 between the free layer, which is the third ferromagnet 66, and the hard magnet 74 is extremely sensitive because the hard biasing strength becomes smaller in proportion to the thickness so that stabilization is inefficient. Thus, the insulator 72 should be very thin. Conversely, attempts to make the insulator thinner, result in short-circuiting of the current passing between the shield/bottom and shield/top leads 52 and 70.

Figure 4:
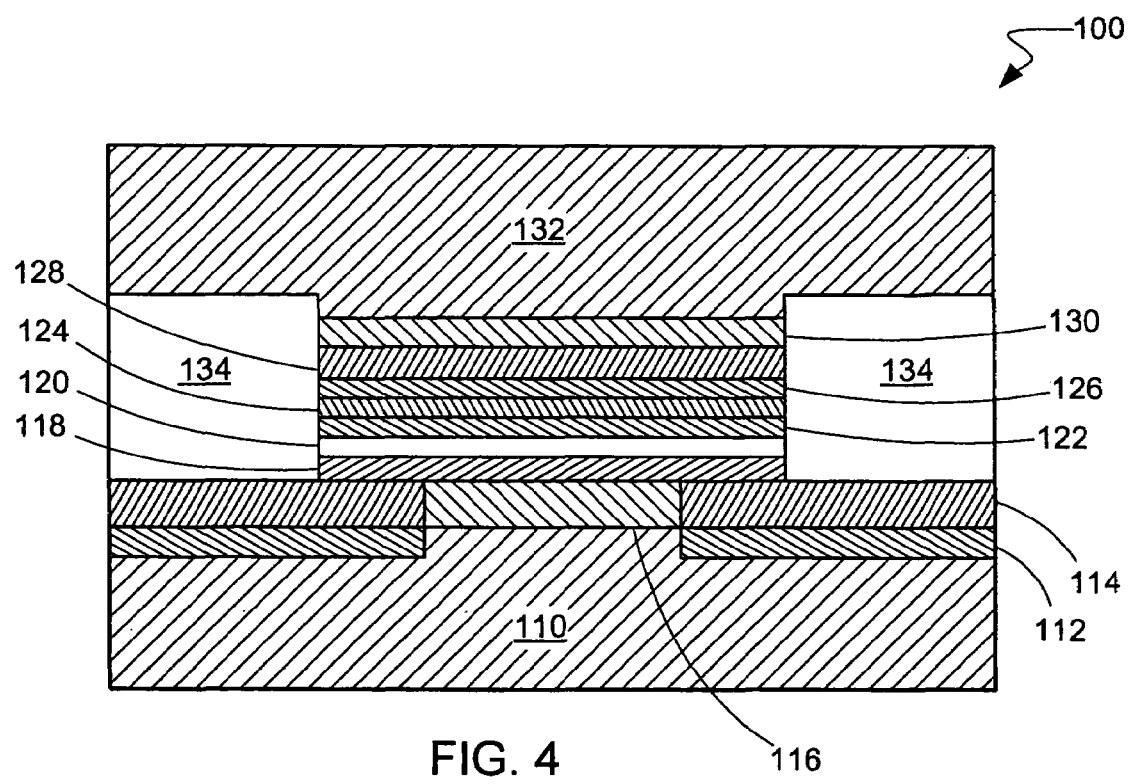
FIG. 4 is a view of a spin-dependent tunneling sensor with longitudinal hard biasing in accordance with the present invention.

Referring now to FIG. 4, therein is shown a longitudinally hard biased spin-dependent tunneling sensor (HBSDTS) 100 according to the present invention. The HBSDTS 100 has a shield/bottom lead 110. The shield/bottom lead 110 is generally of nickel iron (NiFe) or other conductive material, and/or where there is a separate shield, the conductive material is of gold (Au), copper (Cu), or other conductive material.

The shield/bottom lead 110 has a recess in which a seed material 112 is deposited. The seed material 112 is of a material such as chromium (Cr) or nickel aluminum (NiAl) for the deposition of a hard magnet 114.

The hard magnet 114 can be of a material such as cobalt platinum (CoPt), cobalt chrome platinum (CoCrPt), cobalt chrome tantalum (CoCrTa), or cobalt chrome tantalum platinum (CoCrTaPt).

The first gap spacer 116 is of a nonmagnetic, hard, conductive material such as copper (Cu), tantalum (Ta), or chromium (Cr).

A free layer 118 is located in contact with and above the hard magnet 114 and is in electrical contact with the first gap spacer 116. In the present invention, the free layer 118 is a ferromagnetic material such as cobalt iron (CoFe) or nickel iron (NiFe).

A tunneling barrier layer 120 is positioned above the free layer 118. The tunneling barrier layer 120 is of a material such as aluminum oxide ($Al_2O_3$), aluminum nitride (AlN), or chromium oxide (CrO).

A first pinned layer 122 is above the tunneling barrier layer 120 and is a ferromagnetic material such as cobalt (Co), iron (Fe), cobalt iron (CoFe), nickel iron (NiFe), or cobalt nickel iron (CoNiFe). The first pinned layer 122 also overhangs the hard magnet 114.

A nonmagnetic coupling layer 124 is disposed above the first pinned layer 122. The nonmagnetic coupling layer 124 is of a material such as ruthenium (Ru).

A second pinned layer 126 is deposited on the nonmagnetic coupling layer 124, which separates the first and second pinned layers 122 and 126. The second pinned layer 126 is a ferromagnetic material such as cobalt iron (CoFe) or nickel iron (NiFe).

A pinning layer 128 is positioned above the second pinned layer 126 and pins the second pinned layer 126. The pinning layer 128 is of a material such as platinum manganese (PtMn), iron manganese (FeMn), nickel manganese (NiMn), iridium manganese (IrMn), or nickel oxide (NiO).

A second gap spacer 130 separates the pinning layer 128 from a shield/top lead 132. The second gap spacer 130 is a nonmagnetic and conductive material such as copper (Cu), tantalum (Ta), or chromium (Cr). The gap spacers are sized so as to place the free layer 118 equidistant between the shield/bottom lead 110 and the shield/top lead 132.

The shield/top lead 132 is generally of nickel iron (NiFe) or other conductive material, and/or where there is a separate shield, the conductive material is of gold (Au), copper (Cu), or other conductive material.

An insulator 134 protects the operative components of the HBSDTS 100. The insulator 134 is of an insulating material, such as aluminum oxide ($Al_2O_3$), silicon dioxide ($SiO_2$), tantalum oxide ($Ta_2O_5$), and silicon nitride ($Si_3N_4$).

The HBSDTS 100 solves the problems previously associated with insulation thickness criticality between the hard magnet 74 and the third ferromagnet 66, which is the free layer. In the present invention, the hard magnet 114 is in direct contact with the free layer 118 for maximum stabilization while there is no problem with a short-circuit path through the hard magnet 114.

Figure 5:
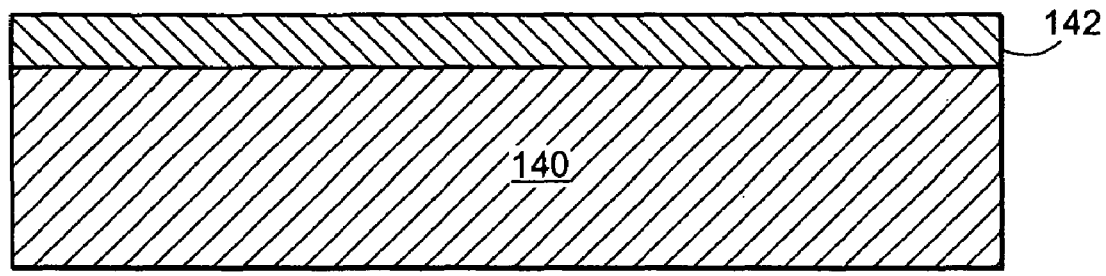
FIG. 5 is a view of the first stage in the manufacture of the longitudinally hard biased spin-dependent tunneling sensor in accordance with the present invention.

Referring now to FIG. 5, therein is shown a first stage in the manufacture of the HBSDTS 100.

A shield/bottom lead material 140 is deposited on a substrate (not shown), which could be of a material such as alumina ($Al_xO_y$) or alumina-titanium carbide ($Al_2O_3TiC$). Subsequently, a first gap spacer material 142 is deposited on the shield/bottom lead material 140.

Figure 6:
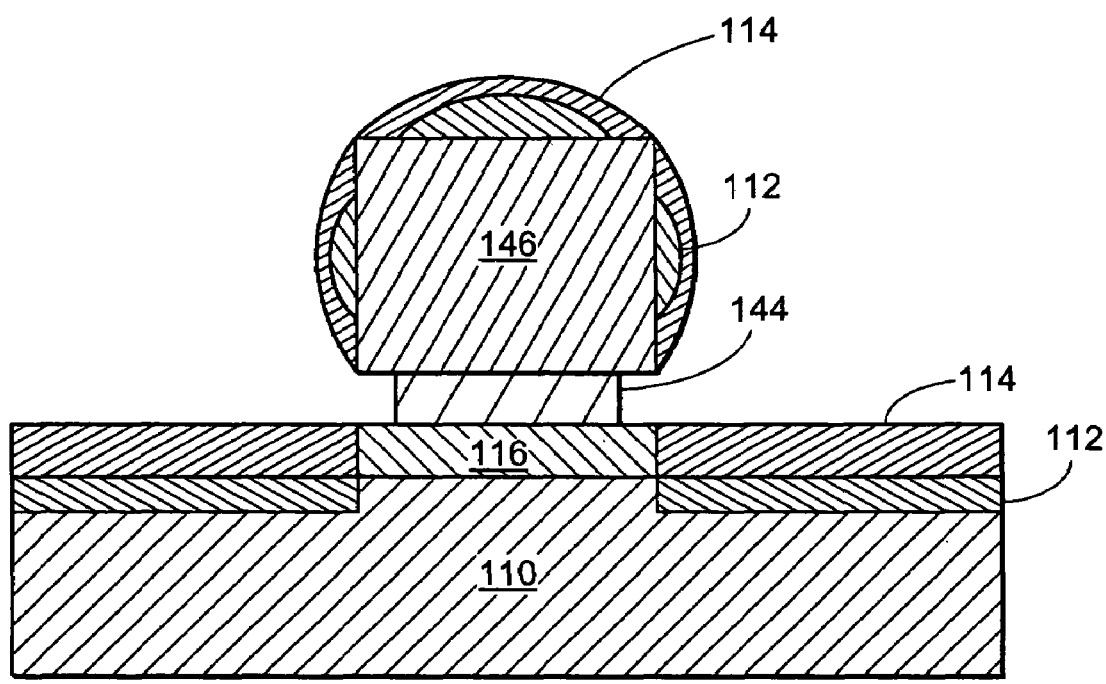
FIG. 6 is the structure of FIG. 5 after several manufacturing process steps.

Referring now to FIG. 6, therein is shown the structure of FIG. 5 after several processing steps. First, a first photoresist 144 is deposited over the first gap spacer material 142. Second, a second photoresist 146 is deposited over the first photoresist 144. A bilayer process leaves the structure shown in FIG. 6 after developing in which the first photoresist 144 is developed more than the second photoresist 146 so the second photoresist 146 overhangs the first photoresist 144.

The first gap spacer material 142 and the shield/bottom lead material 140 are substantially anisotropically etched by a process such as ion milling to remove the first gap spacer material 142 to leave the first gap spacer 116 and to remove a portion of the shield/bottom lead material 140 to form the shield/bottom lead 110.

Subsequently, a deposition process is used to deposit the seed material 112 and the hard magnet 114. The deposition processes which could be used include, but are not limited to, ion beam deposition, sputtering, or physical vapor deposition. The deposition process leaves the seed material 112 and the hard magnet material 114 on the second photoresist 146. It should be noted that the relative thicknesses of the deposition are not to scale in the figure.

Figure 7:
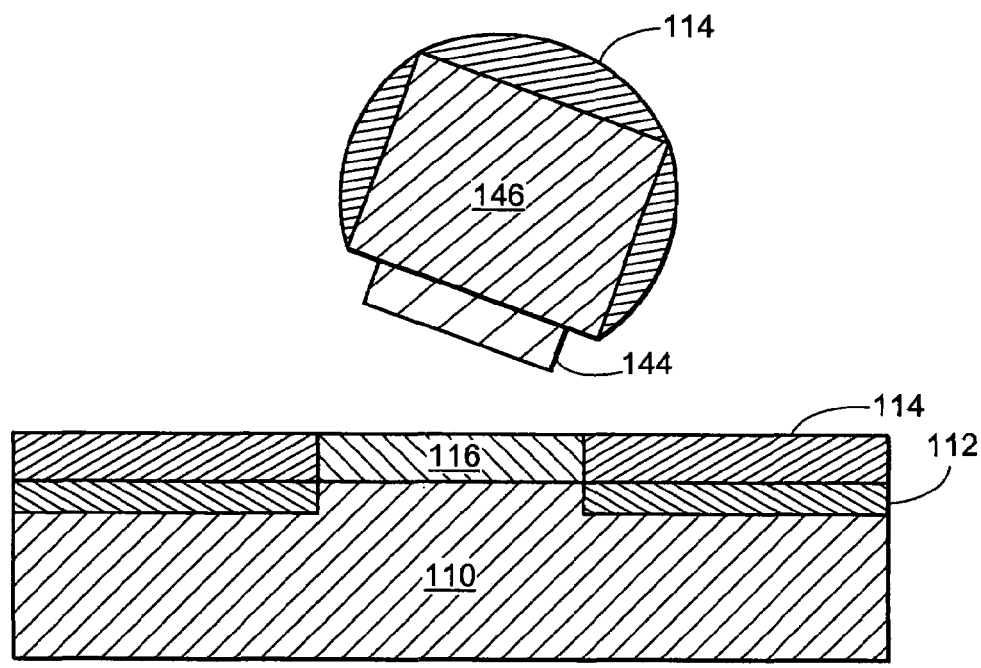
FIG. 7 is the structure of FIG. 6 during a lift-off process.

Referring now to FIG. 7, therein is shown the structure of FIG. 6 in a lift-off process. In the lift-off process, a stripping material is used to release the first and second photoresist 144 and 146 from the surface of the first gap spacer 116. This causes removal of the unnecessary hard magnet material and the seed material 112 to leave a clean surface on the first gap spacer 116.

Figure 8:
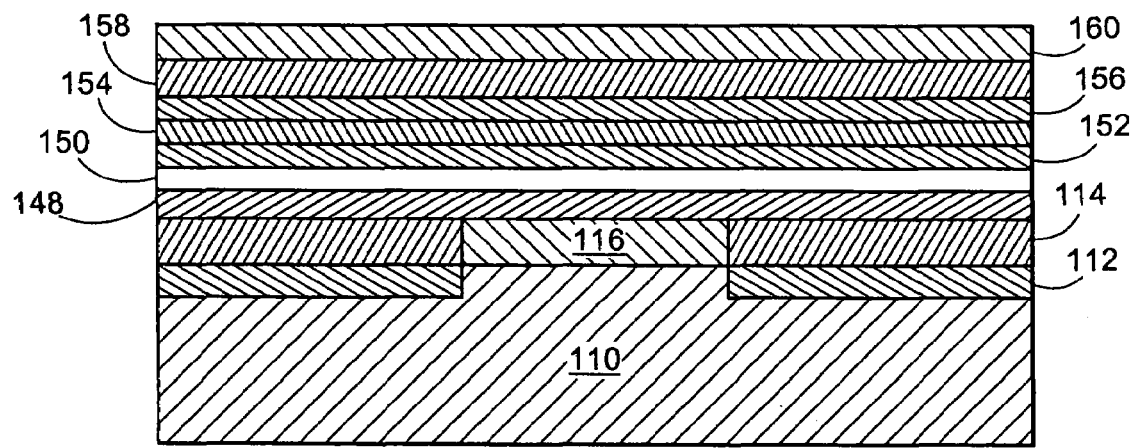
FIG. 8 is the structure of FIG. 7 after successive deposition of a plurality of materials.

Referring now to FIG. 8, therein is shown the structure of FIG. 7 after successive deposition of a first ferromagnetic material 148, a tunneling barrier material 150, a second ferromagnetic material 152, a nonmagnetic coupling material 154, a second ferromagnetic material 156, an antiferromagnetic material 158, and a second gap spacer material 160.

Figure 9:
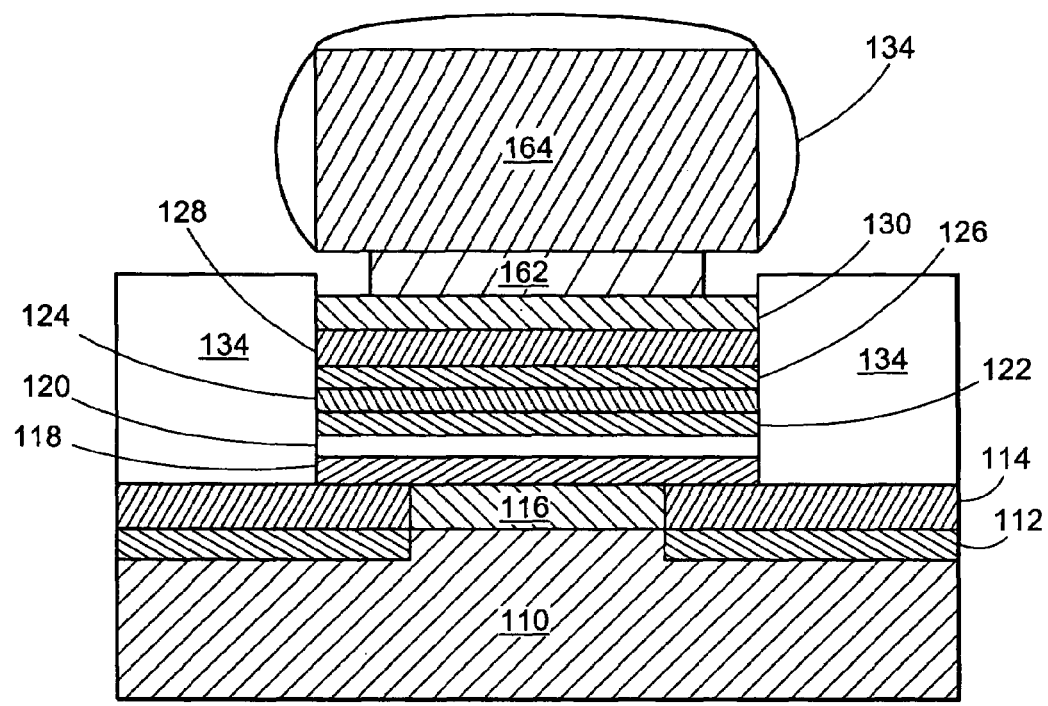
FIG. 9 is the structure of FIG. 8 after further processing.

Referring now to FIG. 9, therein is shown the structure of FIG. 8 after further processing. A further bilayer process is used to deposit another bilayer photoresist of a third photoresist 162 and a fourth photoresist 164.

The fourth photoresist 164 is used in conjunction with another anisotropic process, such as ion milling, to form the free layer 118, the tunneling barrier layer 120, the first pinned layer 122, the nonmagnetic coupling layer 124, the second pinned layer 126, the pinning layer 128, and the second gap spacer 130.

Subsequently, the fourth photoresist 164 is used as a mask during the deposition of the insulator 134. The insulator materials can be deposited by processes such as RF sputtering, ion beam deposition, or reactive sputtering. The preferred thickness of the insulator 134 is from about 100–1,000 Angstroms (Å).

Figure 10:
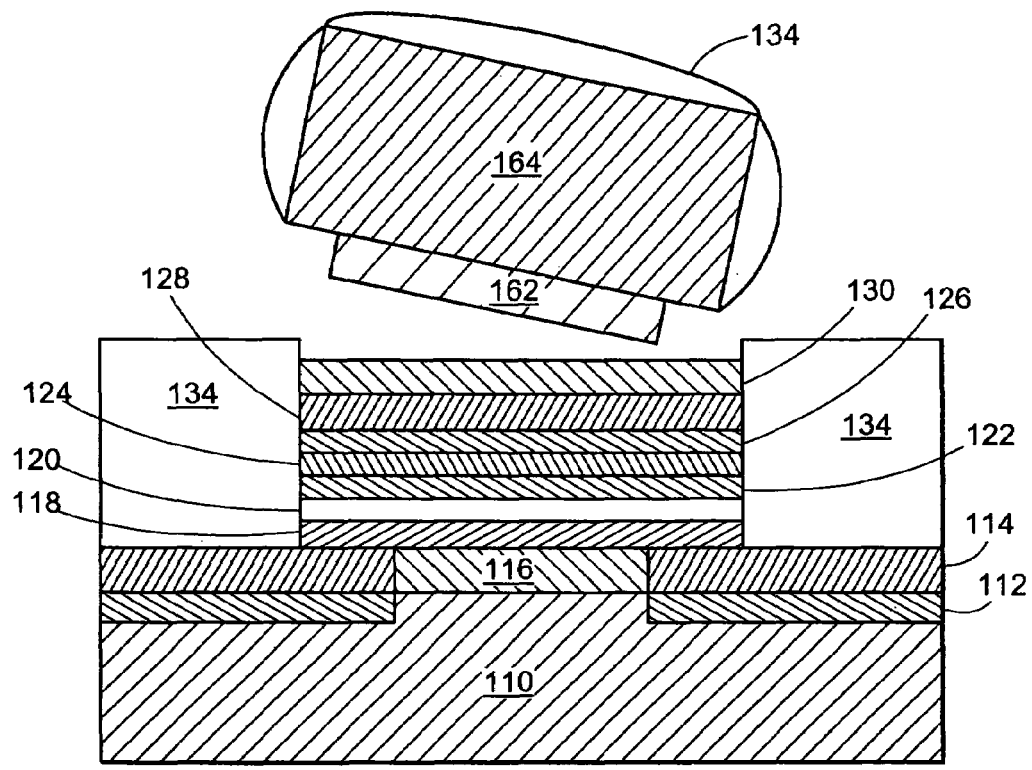
FIG. 10 is the structure of FIG. 9 during a further lift-off process.

Referring now to FIG. 10, therein is shown the structure of FIG. 9 during a lift-off process. The third photoresist 162 is stripped from the second gap spacer 130 and the bilayer photoresist is removed, which removes the insulator 134 over the second gap spacer 130. It should again be noted that the relative thicknesses of the deposition are not to scale in the figure.

Thereafter, a shield/top lead material is deposited and processed to form the shield/top lead 132 and to form the structure shown in FIG. 4 of the present invention.

After the HBSDTS 100 is finished, a writer portion is fabricated on top of the shield/top lead 132.

The present invention provides a method of hard biasing for a SDT read sensor. The positioning of the ferromagnet with the free layer on top provides a very strong longitudinal biasing. This longitudinal biasing is provided by the strong exchange coupling between the free layer 118 and the hard magnet 114. As a result of this exchange coupling, noise from unstable domains at the edge of the free layer 118 can be effectively removed.

Also because the various layers are fabricated after fabrication of the hard magnets, the cause of shorting by hard biasing is eliminated.

Further, the read track width of the SDT read sensor is controlled by the hard magnet contacting the free layer and thus the variation of read track width is smaller than that in a conventional hard biasing system.

The SDT track width is larger than the actual track width. Therefore, the HBSDTS 100 of the present invention will effectively reduce resistance of the sensor with small track width.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for manufacturing a hard bias spin-dependent tunneling sensor comprising:
   forming a first lead;
   forming a first gap spacer adjacent the first lead
   forming a hard magnet over the first lead, and around and in contact with the first gap spacer;
   forming a free layer over the hard magnet;
   forming a tunneling barrier layer over the free layer;
   forming a first pinned layer over the tunneling barrier layer and overhanging the hard magnet;
   forming a nonmagnetic coupling layer over the first pinned layer;
   forming a second pinned layer over the nonmagnetic coupling layer;
   forming a pinning layer over the second pinned layer; and
   forming a second lead over the pinning layer.

2. The method as claimed in claim 1 including:
   forming the first gap spacer over the first lead; and
   forming a second gap spacer over the pinning layer whereby the free layer is equidistant from the first and second leads.

3. The method as claimed in claim 1 including:
   forming the first gap spacer uses a bilayer process.

4. The method as claimed in claim 1 wherein:
   forming the first lead includes using a bilayer process in forming a recess therein;
   forming the hard magnet includes forming a seed layer in the recess of the first lead; and
   forming the hard magnet includes forming a hard biasing material over the seed layer.

5. The method as claimed in claim 1 wherein:
   forming the free layer, the tunneling barrier layer, the first pinned layer, the nonmagnetic coupling layer, and the pinning layer includes using a brayer process;
   and including:
   forming an insulator over the hard magnet and around the free layer, the tunneling barrier layer, the first pinned layer, the nonmagnetic coupling layer, the second pinned layer and the pinning layer.

6. A method for manufacturing a hard bias spin-dependent tunneling sensor comprising:
   providing a substrate;
   forming over the substrate, a shield/first lead of a conductive material;
   forming a first gap spacer adjacent the shield/first lead;
   forming over the shield/first lead, a hard magnet containing a material selected from a group consisting of cobalt, chrome, platinum, tantalum, and a combination thereof, the hard magnet being is formed around and in contact with the first gap spacer;
   forming over the hard magnet, a free layer containing a material selected from a group consisting of cobalt, iron, nickel, and a combination thereof;
   forming over the free layer, a tunneling barrier layer containing a material selected from a group consisting of aluminum, chromium, an oxide, a nitride, and a combination thereof;
   forming over the tunneling barrier layer and overhanging the hard magnet, a first pinned layer containing a material selected from a group consisting of cobalt, iron, nickel, and a combination thereof;
   forming over the first pinned layer, a nonmagnetic coupling layer containing ruthenium;
   forming over the nonmagnetic coupling layer, a second pinned layer containing a material selected from a group consisting of cobalt, iron, nickel, and a combination thereof;
   forming over the second pinned layer, a pinning layer containing a material selected from a group consisting of platinum, palladium, manganese, iron, nickel, iridium, an oxide, and a combination thereof; and
   forming over the pinning layer, a shield/second lead of a conductive material.

7. The method as claimed in claim 6 including:
   forming over the shield/first lead, the first gap spacer from a nonmagnetic and conductive material; and
   forming over the pinning layer, a second gap spacer from a nonmagnetic and conductive material whereby the free layer is equally spaced from the shield/first lead and the shield/second lead.

8. The method as claimed in claim 6 wherein:
   forming the first gap spacer uses a bilayer process.

9. The method as claimed in claim 6 wherein:
   forming the shield/first lead includes using a bilayer process in forming a recess therein;
   forming the hard magnet includes forming a seed layer in the recess of the shield/first lead;
   forming the hard magnet includes forming a hard biasing material over the seed layer; and
   forming the free layer forms the free layer in contact with the hard magnet.

10. The method as claimed in claim 6 wherein:
    forming the free layer, the tunneling barrier layer, the first pinned layer, the nonmagnetic coupling layer, and the pinning layer includes using a bilayer process;
    and including:
    forming an insulator over the hard magnet and around the free layer, the tunneling barrier layer, the first pinned layer, the nonmagnetic coupling layer, the second pinned layer and the pinning layer.

11. A hard bias spin-dependent tunneling sensor comprising:
    a first lead;
    a first gap spacer adjacent the first lead;
    a hard magnet over the first lead, the hard magnet formed around and in contact with the first gap spacer;
    a free layer over the hard magnet;
    a tunneling barrier layer over the free layer;
    a first pinned layer over the tunneling barrier layer and overhanging the hard magnet;
    a nonmagnetic coupling layer over the first pinned layer;

a second pinned layer over the nonmagnetic coupling layer;

a pinning layer over the second pinned layer; and a second lead over the pinning layer.

12. The sensor as claimed in claim 11 including:

the first gap spacer over the first lead; and a second gap spacer over the pinning layer whereby the free layer is equally spaced from the first and second leads.

13. The sensor as claimed in claim 11 wherein:

the first lead has a recess provided therein;

a seed layer in the recess of the first lead; and the hard magnet is formed over the seed layer.

14. The sensor as claimed in claim 11 including:

an insulator over the hard magnet and around the free layer, the tunneling barrier layer, the first pinned layer, the nonmagnetic coupling layer, the second pinned layer, and the pinning layer.

15. A hard bias spin-dependent tunneling sensor comprising:

a substrate;

a shield/first lead of a conductive material over the substrate;

a first gap spacer adjacent the shield/first lead a hard magnet containing a material selected from a group consisting of cobalt, chrome, platinum, tantalum, and a combination thereof over the shield/first lead, the hard magnet formed around and in contact with the first gap spacer;

a free layer containing a material selected from a group consisting of cobalt, iron, nickel, and a combination thereof over the hard magnet;

a tunneling barrier layer containing a material selected from a group consisting of aluminum, chromium, an oxide, a nitride, and a combination thereof over the free layer;

a first pinned layer containing a material selected from a group consisting of cobalt, iron, nickel, and a combination thereof over the tunneling barrier layer and overhanging the hard magnet;

a nonmagnetic coupling layer containing ruthenium over the first pinned layer;

a second pinned layer containing a material selected from a group consisting of cobalt, iron, nickel, and a combination thereof over the nonmagnetic coupling layer;

a pinning layer containing a material selected from a group consisting of platinum, palladium, manganese, iron, nickel, iridium, an oxide, and a combination thereof over the second pinned layer; and a shield/second lead of a conductive material over the pinning layer.

16. The sensor as claimed in claim 15 including:

the first gap spacer of a nonmagnetic, hard, conductive material over the shield/first lead; and a second gap spacer of a nonmagnetic, hard, and conductive material whereby the free layer is equidistant from the shield/first lead and the shield/second lead.

17. The sensor as claimed in claim 15 wherein:

the shield/first lead has a recess provided therein;

and including:

a seed layer in the recess;

and wherein:

the hard magnet is formed over the seed layer; and the free layer is formed in contact with the hard magnet.

18. The sensor as claimed in claim 15 including:

an insulator over the hard magnet and around the free layer, the tunneling barrier layer, the first pinned layer, the nonmagnetic coupling layer, the second pinned layer and the pinning layer.

* * * * *

UNITED STATES PATENT AND TRADEMARK OFFICE
CERTIFICATE OF CORRECTION

PATENT NO. : 7,027,274 B1  Page 1 of 1
APPLICATION NO. : 09/943859
DATED : April 11, 2006
INVENTOR(S) : Kyusik Sin et al.

It is certified that error appears in the above-identified patent and that said Letters Patent is hereby corrected as shown below:

Col. 8, Line 4:  Delete "is".

Signed and Sealed this

Sixth Day of March, 2007

JON W. DUDAS
*Director of the United States Patent and Trademark Office*